Figures 1, 2, 3:
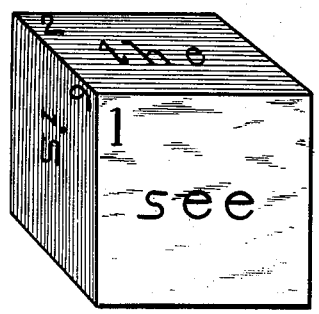

(No Model.)

S. G. KENYON.
EDUCATIONAL BLOCK.

No. 341,754.          Patented May 11, 1886.

| 1 | 1 | 1 | 1 | 1 | 1 | |
|---|---|---|---|---|---|---|
| The | cat | can | see | a | rat | Red. |
| 2 | 2 | 2 | 2 | 2 | 2 | |
| It | is | my | good | old | cap | Yellow. |
| 3 | 3 | 3 | 3 | 3 | 3 | |
| Did | she | hear | that | fat | mouse | Green. |
| 4 | 4 | 4 | 4 | 4 | 4 | |
| Let | Frank | get | his | big | knife | Orange. |
| 5 | 5 | 5 | 5 | 5 | 5 | |
| Will | my | little | white | fish | swim | Blue. |
| 6 | 6 | 6 | 6 | 6 | 6 | |
| A | hoop | is | in | one | hand | Purple. |

| 1 | 1 | 1 | 1 | 1 | 1 |
|---|---|---|---|---|---|
| Was | the | sled | in | the | snow |
| 4 | 4 | 4 | 4 | 4 | 4 |
| The | bat | is | on | the | barn |

Witnesses.
Thos. H. Hutchins.
Wm. J. Hutchins.

Inventor.
Sophia G. Kenyon.

UNITED STATES PATENT OFFICE.

SOPHIA G. KENYON, OF JOLIET, ILLINOIS.

EDUCATIONAL BLOCKS.

SPECIFICATION forming part of Letters Patent No. 341,754, dated May 11, 1886.

Application filed January 11, 1886. Serial No. 188,226. (No model.)

*To all whom it may concern:*

Be it known that I, SOPHIA G. KENYON, a citizen of the United States of America, residing at Joliet, in the county of Will and State of Illinois, have invented certain new and useful Improvements in Educational Blocks, of which the following is a specification, reference being had therein to the accompanying drawings.

This invention relates to certain improvements in blocks for educational purposes, which improvements are fully set forth and explained in the following specification and claims, reference being had to the annexed drawings, making a part of this specification, in which—

Figure 1 is a plan view on the top of a set of thirty-six of said blocks laid in a square, six each way, so those of like color form separate horizontal rows, and so each block of the row will show a like number and the words thereon form sentences. Fig. 2 is a perspective view of six of said blocks laid in a horizontal row in like manner as those in Fig. 1, showing two sentences; and Fig. 3 is a perspective view of a single block, showing the numbers and words on its three exposed sides.

Referring to the drawings, each block is represented to be a cube, having each of its sides numbered from 1 to 6, both inclusive, and having a sentence-word either in print or script on each of its sides, so arranged that when any six of said blocks of like color are laid side by side in a row, and with a like number up, sentences may be formed by means of said words, as shown in Figs. 1 and 2.

Each row of blocks is represented in Fig. 1 to be of different colors, so they may by means of said colors help to indicate to a child which blocks to select, and the numbers show him how to lay them in rows to form sentences, it of course being left to the child to arrange the words to form the sentence.

The set of blocks may be of any convenient number, but thirty-six are shown in Fig. 1 as a convenient set, each horizontal row being of a different color from the other rows, and presenting two hundred and sixteen sentence-words in aggregate. The several different colors not only assist a child in selecting the proper blocks to form sentences, but serve to teach it colors.

These blocks are designed for use in schools and kindergartens and as an educational toy.

Any other form of block may be used, only so they can be provided with the numbers and sentence-words, and be used as set forth.

Having thus described my invention, what I claim as new, and desire to secure by Letters Patent is as follows, to wit:

1. As a new article of manufacture, a cubical block having its several sides numbered and provided with sentence-words, substantially as and for the purpose set forth.

2. As a new article of manufacture, a series or set of different-colored cubical blocks having numbers and sentence-words on each of their several sides, and arranged so that blocks of like color may be used to form sentences, substantially as and for the purpose set forth.

3. As a new article of manufacture, a set of differently-colored cubical blocks, each having figures and sentence-words marked on their several sides, and so constructed that when like numbers of like colors are placed side by side and properly arranged, sentences may be formed, as set forth.

4. As a new article of manufacture, a geometrical block having its side or sides numbered and provided with sentence-words, as and for the purpose set forth.

SOPHIA G. KENYON.

Witnesses:
 THOS. H. HUTCHINS,
 J. E. BUSH.